Nov. 13, 1962 D. J. JUTZI 3,063,097
APPARATUS FOR FORMING SEALS
Filed Dec. 4, 1959 2 Sheets-Sheet 1

INVENTOR.
Donald J. Jutzi,
BY
Cromwell, Greist & Warden
Attys.

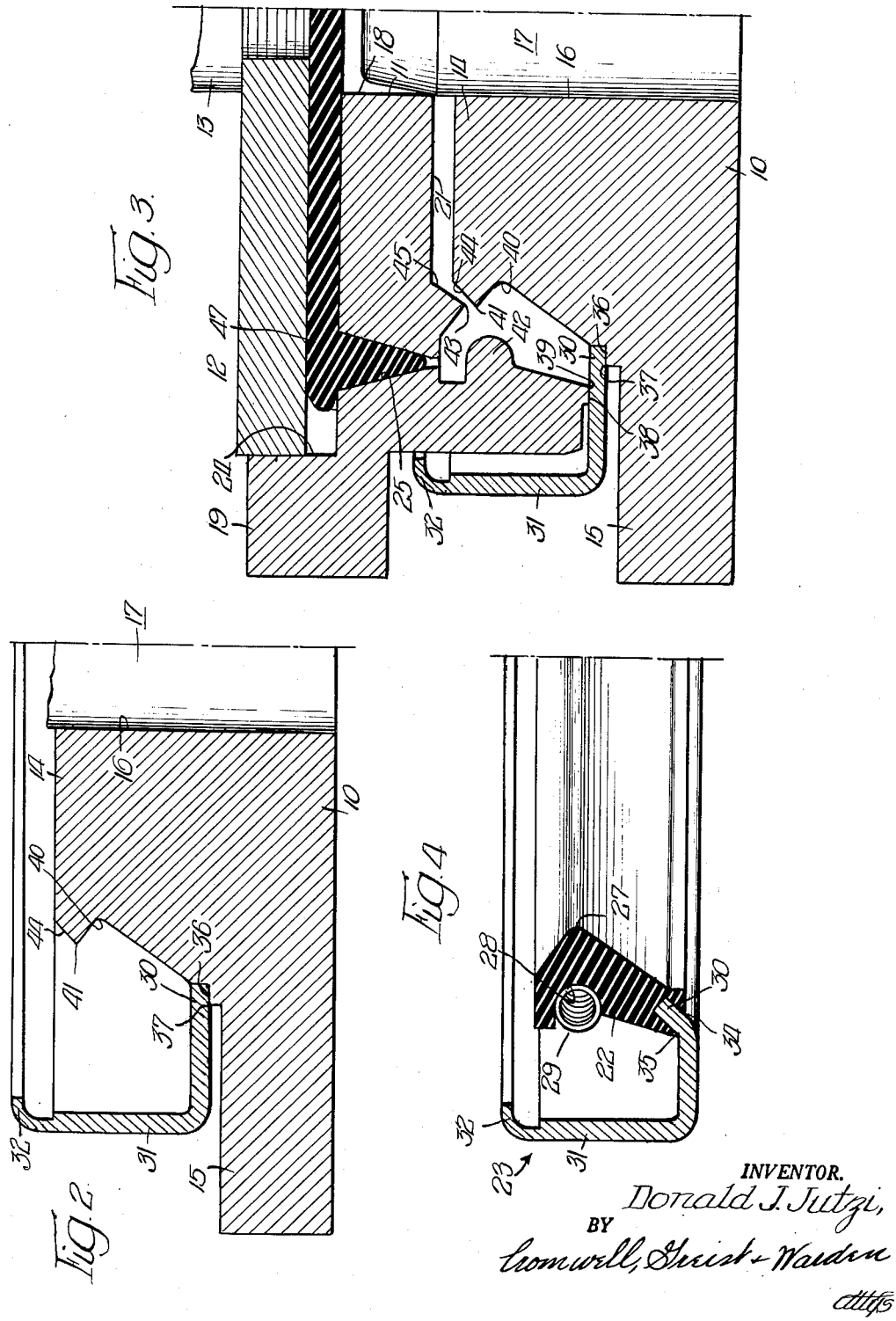

United States Patent Office 3,063,097
Patented Nov. 13, 1962

3,063,097
APPARATUS FOR FORMING SEALS
Donald J. Jutzi, Chicago, Ill., assignor to Chicago Rawhide Mfg. Co., Chicago, Ill., a corporation of Illinois
Filed Dec. 4, 1959, Ser. No. 857,367
2 Claims. (Cl. 18—36)

The present invention relates to a new and improved molding apparatus for forming oil seals of known type. More specifically, the apparatus of the present invention provides for the forming of a finished seal which comprises a flexible sealing member bonded to a seal casing, the apparatus providing for complete forming of the seal in a single step molding operation in such a manner that the resultant seal is "flashless" and, of particular importance, the critical tip or edge area of the seal lip of the flexible sealing member portion is completely "flashless" and does not require trimming or buffing which would necessitate final shaping and dimensioning.

Considerable efforts have been made toward the forming of a finished oil seal as a result of a single step molding operation. In forming such a seal there are two main considerations. The first is that of providing for the receipt of at least a portion of the metallic casing of the seal assembly within the flexible sealing member forming mold to provide for bonding of the flexible sealing member directly to the casing during shaping and curing of the sealing member. In attempting to carry out this operational procedure it has been found difficult to design a mold which is capable of receiving a portion of the casing therein and sealing this portion against loss of stock material and the formation of "flash" during sealing member shaping and curing. The presence of "flash" requires subsequent buffing operations which add to the cost of manufacture.

The second main consideration resides in the elimination of excess stock material on the sealing member in the seal lip area requiring subsequent removal and seal lip dimensioning and shaping. Seal forming molds must be made from two or more parts which cooperate to define the mold cavity, these parts being separated following the molding and curing operation to an extent permitting removal of the finished sealing member from the mold without damage thereto. The areas of juncture of the mold parts are difficult to seal and it has been the practice to form an oversize sealing member particularly in the flexible lip area thereof. Following removal of the sealing member from the mold, it has been necessary to lathe trim the rather substantial excess stock from the sealing member and actually dimension and shape the seal lip area thereof. The seal lip is that portion which engages a shaft and the dimension of this lip must be closely controlled in order to obtain efficient sealing action on a shaft during subsequent use of the completed seal. Molds which eliminate excess stock material formation by parting in the seal lip area have not been found acceptable as "flash" is formed at the seal lip and subsequent buffing or trimming often results in dimensional damage to the lip.

It is an object of the present invention to provide a new and improved apparatus for forming a shaft-type seal, the flexible sealing member portion thereof being at least completely "flashless" in critical dimensional areas thereof.

A further object of the present invention is to provide a new and improved molding apparatus for use in forming a seal, the apparatus including cooperating parts of new and improved design and location to provide either for "flash" elimination or controlled "flash" placement to an extent that subsequent "flash" removal operations are not sensitive as to critical dimension retention, and in connection with controlled "flash" location, the apparatus making use of a special mold parting land arrangement of new and improved design providing for controlled finished dimension molding of the seal lip portion and ready sealing member removal.

Still a further object of the present invention is to provide a new and improved mold for use in forming a radially acting shaft-type seal, the mold including means whereby a metallic seal casing may be accommodated therein and held in the mold during sealing member shaping and curing accompanied by the bonding of the sealing member to the casing with the absence of "flash" in the bonded areas.

Other objects not specifically set forth will become apparent from the following detailed description made in conjunction with the accompanying drawings wherein:

FIG. 2 is a fragmentary half section of the bottom plate of the mold of FIG. 1 illustrating the positioning of a seal casing thereon prior to the molding operation;

FIG. 3 is a fragmentary half section of the mold of FIG. 1 illustrating operation thereof during closing; and FIG. 4 is a half section of a seal formed by the mold of the present invention.

Figure 1:
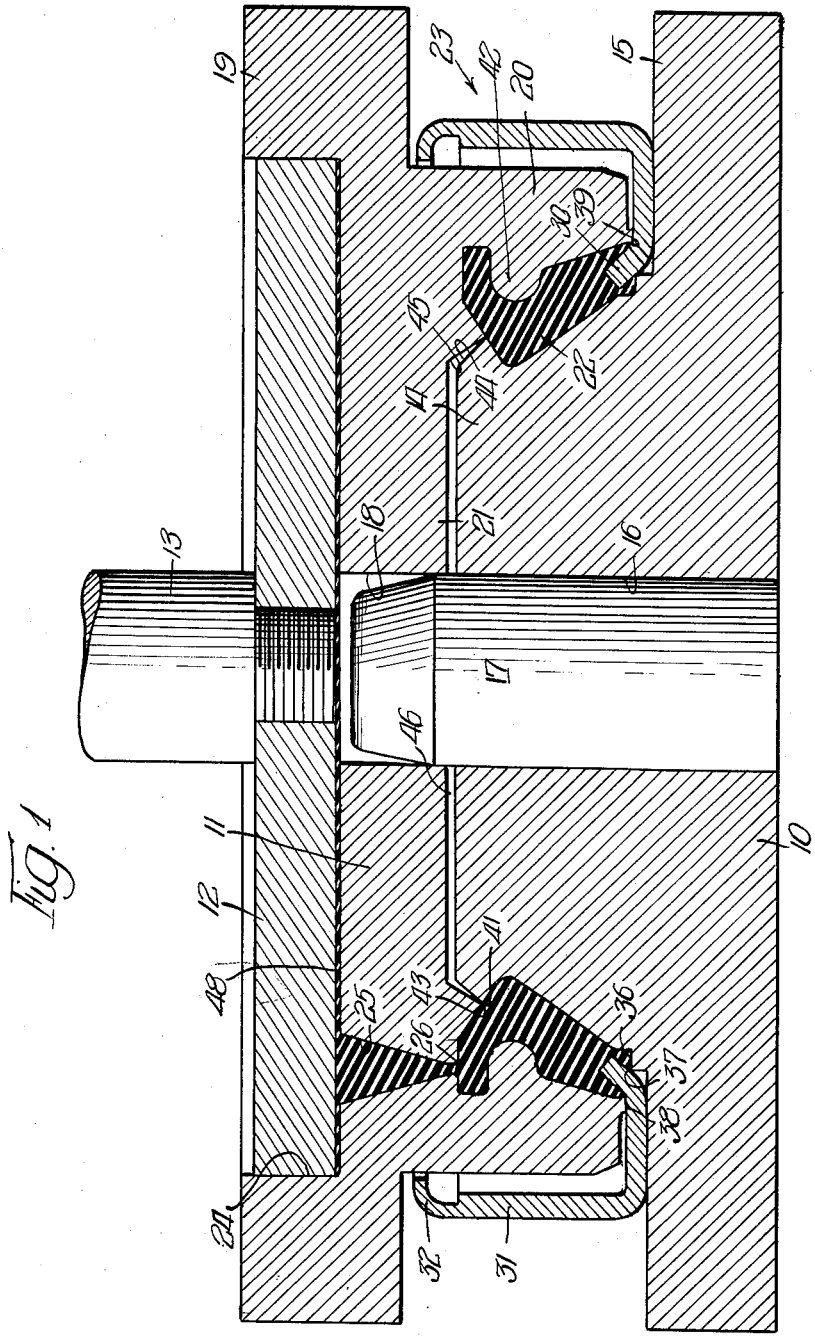
FIG. 1 is a fragmentary section of the mold of the present invention illustrating the same in closed condition and with a seal casing and mold sealing member therein.

As particularly shown in FIG. 1, the embodiment of the mold illustrating the principles of the present invention includes a bottom place 10, a top plate 11 and a press means including press plate or platen 12 suitably attached to a reciprocating or stationary ram or shaft 13. The bottom plate 10 is provided with a raised central portion 14 and an outer radial flange-like base 15. The central portion 14 has suitably fixed in a drilled opening 16 extending therethrough a centering pin 17 which projects substantially above the top surface of the central portion 14 and which is beveled at the top thereof to be received in a central drilled opening 18 in the top plate 11 for self-alignment of the plates 10 and 11 when the same are moved into closed mold relation.

The top plate 11 is formed with an outer radial flange-like portion 19, an annular depending portion 20 positioned radially inwardly from the outer margin of the flange-like portion 19, and a generally flat central portion 21. The inner side surface of the depending portion 20 and the outer side surface of the raised central portion 14 cooperatively define therebetween a mold cavity in which a flexible sealing member 22 of a radially acting shaft-type seal is formed, the seal being generally designated by the numeral 23 (FIG. 4). The top surface of the top plate is centrally recessed to define a press plate cavity 24 in which the press plate 12 is received to compress, distribute and deliver rubber or rubber-like stock material into the mold cavity. The delivery of the stock material may be attended to by the provision of any suitable sprue means such as a plurality of circumferentially spaced sprue holes 25 formed in the top plate 11. The sprue holes 25 are of known configuration being generally inverted cone-shaped with delivery openings 26 of small diameter communicating with the mold cavity.

The radially acting, shaft-type seal 23 formed by the mold of the present invention is illustrated in its finished form in FIG. 4. The flexible sealing member 22 is provided with a seal lip 27 for sealing engagement with a shaft, it being well recognized that the dimension and configuration of this lip portion is quite critical in seal manufacture as it must be capable of circumferentially engaging a shaft to prevent the flow of oil therealong. The radius of the seal lip 27 must be small enough to assure proper radial pressure distribution of the lip against a shaft and yet must be large enough to assure easy removal from the mold as will be more specifically described. Accordingly, it is important that the radius of the seal lip be carefully controlled and the mold design of the present invention provides this within close tolerances.

The flexible sealing member 22 is further provided with a coil spring groove 28 of known type in which a coil spring 29 is mounted upon completed assembly of the seal 23. A marginal portion of the sealing member 22 is bonded to an angled inner marginal portion 30 of a metallic seal casing 31 of known type. The casing 31 is provided with a slightly rolled thin flange portion 32 designed to aid in seal insertion in the bore of a shaft housing. The edges 34 and 35 of the rubber bond areas of the sealing member 22 with the inner marginal portion 30 of the casing 31 are formed without "flash" in a manner to be described thus eliminating any trimming or buffing operations following removal of the seal from the mold.

Referring to FIGS. 1-3, the casing 31 of the seal 23 is illustrated as being centered about the raised central portion 14 of the bottom plate 10 in engagement with a shoulder 36 which defines a circumferentially continuous sharp land 37 along the outer top edge thereof. FIG. 2 illustrates the centering of the casing 31 about the raised central portion 14 of the bottom plate 10 prior to placement of the top plate 11 in cooperative relation with the bottom plate. It will be seen that the inner marginal portion 30 of the casing 31 is coplanar with its associated leg segment of the casing 31 prior to mold closing and rests flush on the top surface of the shoulder 36.

As shown in FIGS. 1 and 3, the inner bottom edge of the depending portion 20 of the top plate 11 is provided with a foot-like projection 38. This projection engages the casing 31 adjacent the inner marginal portion 30 thereof to provide for efficient bending or flexing thereof. This foot portion by reason of projecting downwardly localizes mold closing pressure on the inner marginal portion 30 to bend the same. The inner bottom edge of the foot portion 38 defines a circumferentially continuous, sharp land 39 which engages the casing 31 in off-set relation with the land 37 to provide therewith casing bending pressure application areas as well as rubber stock material confining areas. With this arrangement, the cooperating lands 37 and 39 combined with the inner marginal portion 30 of the seal casing 31 close off the bottom area of the mold cavity and confine the rubber stock material therein while the lands 37 and 39 cooperatively bend the inner marginal portion 30 of the casing 31 therebetween upon complete closing of the mold as shown in FIG. 1. This function of the mold further results in the final placement of the marginal portion 30 of the casing 31 at an angle within the mold cavity and free to receive thereabout the rubber stock material for bonding of this material to the marginal portion 30 as a result of stock shaping pressure and stock curing temperature used during the molding operation.

As previously described, the lands 37 and 39 are sharply defined and actually depress the material of the casing contacted thereby to cut off the flow of stock material along the casing and out of the mold cavity. This feature provides for "flashless" bonding of the rubber stock material to the casing to eliminate the necessity of any subsequent trimming or buffing operations in the areas of the rubber bond. The "flashless" molding feature in the areas of the bond is of particular importance in connection with the final appearance of the finished seal 23 especially along the edge 34 thereof which is readily observable.

FIGS. 1 and 3 illustrate the configuration of the mold cavity as defined by the cooperating, radially spaced, juxtaposed side surfaces of the raised central portion 14 of the bottom plate 10 and the depending portion 20 of the top plate 11. The outer side surface of the raised central portion 14 defines by itself a seal lip shaping area or cavity 40 positioned above the shoulder 36. The seal lip cavity 40 terminates at the top thereof with a sharply defined, circumferentially continuous and radially outwardly directed mold parting land 41 (best illustrated in FIG. 3). The inner side surface of the depending portion 20 of the top plate 11 above the foot portion 38 defines a mold cavity closing portion which completes the contour of the inner surface of the flexible sealing member 22. This surface consists essentially of a rounded, circumferentially continuous projection 42 which shapes the spring receiving groove 28 of the flexible member 22.

The bottom surface of the central portion 21 of the top plate 11 terminates in juncture with the inner side surface of the depending portion 20 in the vicinity of the openings 26 of the sprue holes 25. Spaced radially inwardly from the openings 26 is a circumferentially continuous, axially downwardly directed and sharply defined mold parting land 43 which is arranged for cooperative engagement with the land 41 of the bottom plate 10. The lands 41 and 43 are basically defined by juxtaposed flats 44 and 45, respectively, which are designed for at least partial engagement in the vicinity of the lands 41 and 43 to close off the mold cavity in an area which is intermediate the seal lip cavity 40 and the sprue openings 26. The location of the mold parting lands 41 and 43 in the mold of the present invention is of particular importance for reasons to be described.

Referring particularly to FIG. 1, it will be noted that the flats 44 and 45 do not parallel one another but converge inwardly toward the mold cavity. With this arrangement, upon the closing of the mold the lands 41 and 43 become mutually engaged while maintaining a slight space between the top surface of the raised central portion 14 of the bottom plate 10 and the bottom surface of the central portion 21 of the top plate 11. This slight space is identified by the numeral 46 in FIG. 1. The arrangement described provides an escape path for gases formed or trapped in the mold cavity and which are forced out of the mold cavity between the parting lands 41 and 43 during closing and filling of the mold. While the engaged lands 41 and 43 permit the escape of gas from the mold cavity, the pressure between the mating surfaces thereof is sufficiently great to prevent the escape of uncured rubber from the mold cavity. In order to provide these results, the lands 41 and 43 are preferably constructed so that the flats 44 and 45 are restricted to angular variation from one another to within about 1° to 10°. By way of example, the flat surface 44 may be formed at an angle displaced from the horizontal at about 40°. The flat surface 45 may be formed at an angle displaced from the horizontal at about 45°. Thus the difference in angularity between the flats 44 and 45 in this instance is 5°.

The provision and location of the special parting lands 41 and 43 within the mold is of particular importance as previously described. These lands as constructed will eliminate "flash" to an extent that no trimming or buffing is necessary. Even if the parting lands should cause the formation of a slight ridge-like mark on the adjacent surface of the sealing member 22, the ridge as is true of all "flash" may be readily removed by subsequent buffing operations. The location of the parting lands provides for placement of any "flash" in an area which is not critical to the final shaft dimension of the seal. In some mold designs, mold part separation has occurred at the tip of the seal lip. At first glance, this is an ideal location for the mold parting surfaces as upon separation of the mold plates the cured sealing member may be readily removed from the mold without interference by any of the parts thereof. However, subsequent trimming or buffing operations to remove any "flash" at the tip of the seal lip must be very carefully carried out as such operations actually shape and dimension the seal lip. The location of the parting lands 41 and 43 in the mold of the present invention permits ready stripping or removal of the finished sealing member from the mold parts without damage to the seal lip portion thereof. This location further removes the aspects of criticality from any subsequent trimming or buffing operations during which any "flash" formed on the sealing member is removed therefrom. Such trimming and buffing operations are not carried out on or even near the tip of the seal lip and errors in these operations do not affect the effective use of the seal lip in subsequent shaft installations.

Elimination of lathe trimming of the seal lip portion permits molding control of the radius of the seal lip to a degree which has not been possible prior to the present invention. The seal lip cavity 40 formed solely in the bottom plate 10 may be accurately shaped to define a seal lip radius which, by way of example, may be maintained within a tolerance of from 0.005 to 0.030 of an inch. As pointed out above, prior practices requiring trimming of excess material from the sealing member necessitated actual final shaping of the seal lip following general molding thereof. Thus it has been the practice that the seal lip was over-dimensioned with final dimensioning being carried out during the trimming operation and operation with the tolerances set forth was exceedingly difficult. The mold of the present invention completely eliminates this practice and the problems attendant thereto.

FIG. 3 illustrates the assembled mold immediately prior to final closing thereof and it will be noted that the casing 31 is properly centered for subsequent bending of the inner marginal portion 30 thereof as shown in FIG. 1 in the closed condition of the mold. Rubber stock material 47 is inserted in the recess 24 of the top plate 11 and upon closing of the mold with the receiving of the press plate 12 within the recess 24, the stock material flows through the sprue holes 25 and into the mold cavity. By the time that the mold cavity is filled with stock material, the inner marginal portion 30 of the casing has been bent into the position shown in FIG. 1 and the outer surface of the casing 31 is bottomed on the top surface of the base flange portion 15 of the bottom plate 10. In this manner the bottom of the mold cavity is completely closed and "flashless" edges 34 and 35 are formed at the bond areas of the sealing member attachment to the casing. The mold parting lands 41 and 43 are also closed and the sealing member 22 is shaped, cured and bonded to the casing 31 as a result of the application of molding pressure and curing heat. Any suitable means may be provided for heating the mold to adequate curing and bonding temperature as by use of a heated press.

Upon completion of the molding and curing operation, the mold is readily disassembled by retraction of the press plate 12 and separation of the top plate 11 from the bottom plate 10. As shown in FIG. 1, a thin membrane 48 of cured stock material remains in the press recess 24 and this may be readily stripped accompanied by removal of stock material from the sprue holes 25, separation of the stock material in the sprue holes from the sealing member 22 readily occurring by reason of the small openings 26 through which the stock material is fed into the mold cavity. It should be understood that no buffing or trimming operations are necessary in any areas of critical dimension of the flexible sealing member 22. Upon removal of the finished seal 23 from the mold, the coil spring 29 is placed in its operative position within the groove 28 of a sealing member 22 to complete the assembly which is now ready for installation.

Obviously certain modifications and variations of the invention as hereinbefore set forth may be made without departing from the spirit and scope thereof, and therefore only such limitations should be imposed as are indicated in the appended claims.

I claim:

1. A mold for forming a seal, said mold comprising a bottom plate having a raised central portion the outer side surface of which having formed therein a circumferentially recessed seal lip forming cavity terminating at the top thereof with a sharply defined and radially outwardly inclined mold parting land which is spaced substantially beyond the deepest portion of said lip forming cavity, a top plate having an annular depending portion removably received about the raised central portion of said bottom plate with the inner side surface thereof defining a cavity closing portion in radially spaced relation with the outer side surface of said raised central portion, said top plate being provided with a generally flat central portion the bottom surface of which terminates in juncture with the inner side surface of said depending portion and is provided with an axially downwardly inclined and sharply defined mold parting land spaced radially inwardly from said depending portion, sprue means in said top plate communicating with the cavity through said central portion of said top plate, and stock material pressure means cooperating with said top plate to force stock material through said sprue means into said cavity and close said mold, the mold parting lands of said top and bottom plates being arranged relative to one another to be mutually engaged along their lowermost end portions upon mold closing, said mold parting lands being provided with engaging flats which converge inwardly toward said cavity and vary in angularity from one another from about 1° to 10°.

2. A mold for forming a seal, said mold comprising a bottom plate having a raised central portion the base of which is provided with a land-defining shoulder raised relative to an outer radial surface portion of said bottom plate, said shoulder being arranged to receive thereon the inner marginal portion of a seal casing centered about said raised central portion and to which a flexible sealing member is to be bonded, the outer side surface of said raised central portion above said shoulder having formed therein a circumferentially recessed seal lip forming cavity terminating at the top thereof with a sharply defined and radially outwardly inclined mold parting land which is spaced substantially beyond the deepest portion of said lip forming cavity, a top plate having an annular depending portion removably received about the raised central portion of said bottom plate, the inner bottom edge of said depending portion defining a seal casing engaging land which is spaced radially outwardly from said shoulder over the outer radial surface portion of said bottom plate to engage the opposite surface of the inner marginal portion of said seal casing and with said shoulder cooperatively bend said inner marginal portion upon movement of said top and bottom plates into closed mold relation, the inner side surface of said depending portion defining a cavity closing portion in radially spaced relation with the outer side surface of said raised central portion, said top plate being provided with a generally flat central portion the bottom surface of which terminates in juncture with the inner side surface of said depending portion and is provided with an axially downwardly inclined and sharply defined mold parting land spaced radially inwardly from said depending portion, sprue means in said top plate communicating with the cavity through said central portion of said top plate, and stock material pressure means cooperating with said top plate to force stock material through said sprue means into said cavity and close said mold to bend a seal casing received therein, the mold parting lands of said top and bottom plates being arranged relative to one another to be mutually engaged along their lowermost end portions upon mold closing, said mold parting lands being provided wtih engaging flats which converge inwardly toward said cavity and vary in angularity from one another from 1° to 10°.

References Cited in the file of this patent

UNITED STATES PATENTS

| | | |
|---|---|---|
| 2,661,498 | Blaurock | Dec. 8, 1953 |
| 2,700,186 | Stover | Jan. 25, 1955 |
| 2,717,793 | Nenzell | Sept. 13, 1955 |
| 2,772,012 | Crabtree | Nov. 27, 1956 |
| 3,004,298 | Haynie | Oct. 17, 1961 |

FOREIGN PATENTS

| | | |
|---|---|---|
| 1,046,916 | France | July 15, 1953 |
| 493,009 | Great Britain | Sept. 30, 1938 |

UNITED STATES PATENT OFFICE
CERTIFICATE OF CORRECTION

Patent No. 3,063,097                      November 13, 1962

Donald J. Jutzi

It is hereby certified that error appears in the above numbered patent requiring correction and that the said Letters Patent should read as corrected below.

Column 8, line 2, after "from" insert -- about --.

Signed and sealed this 14th day of May 1963.

(SEAL)
Attest:

ERNEST W. SWIDER
Attesting Officer

DAVID L. LADD
Commissioner of Patents